United States Patent [19]

Moore

[11] Patent Number: 5,475,941
[45] Date of Patent: Dec. 19, 1995

[54] PORK RIND PLIERS

[76] Inventor: Chuck Moore, 203 Shady Grove Dr., Grandbury, Tex. 76049

[21] Appl. No.: 296,525

[22] Filed: Aug. 26, 1994

[51] Int. Cl.[6] ................................................. A01K 97/00
[52] U.S. Cl. ...................... 43/4; 43/53.5; 7/106; 29/268
[58] Field of Search ........................... 29/268, 798, 241; 430/4; 7/106; 43/53.5

[56] References Cited

U.S. PATENT DOCUMENTS

| | | | |
|---|---|---|---|
| 2,862,327 | 12/1958 | Steinhauser | 43/53.5 |
| 3,540,106 | 11/1970 | Goldman | 29/268 |
| 3,778,919 | 12/1973 | Simon | 43/53.5 |
| 4,050,464 | 9/1977 | Hall | 29/268 |
| 4,843,753 | 7/1989 | Mace | 43/4 |

FOREIGN PATENT DOCUMENTS

| | | | |
|---|---|---|---|
| 0547728 | 9/1956 | Italy | 29/268 |
| 2183197 | 6/1987 | United Kingdom | 43/4 |

*Primary Examiner*—P. Austin Bradley
*Assistant Examiner*—James Minen
*Attorney, Agent, or Firm*—Arthur F. Zobal

[57] ABSTRACT

The pliers have a first arm with first and second ends and a second arm with first and second ends. The two arms are pivotally coupled together. The first ends include a slotted member located opposing and facing a bearing member respectively. The slotted member has a slot with an open end extending therethrough for receiving a hook end of a fishhook. The bearing member has a bearing surface for supporting a rounded portion of the fishhook such that a pork rind may be located between the two members and attached to the hook of a fishhook by moving the first ends to the closed position. The second ends include a hook retaining member located opposing a hook receiving member. The hook retaining member and the hook receiving member have two slots with open ends respectively that extend transverse to each other such that the rounded end of a fishhook may be located in the slot of the hook retaining member and the hook end of a fishhook may be located in the slot of the hook receiving member with an attached pork rind located on a side of the hook receiving member facing away from the hook retaining member for removing the pork rind from the hook when the second ends are moved to an open position.

5 Claims, 3 Drawing Sheets

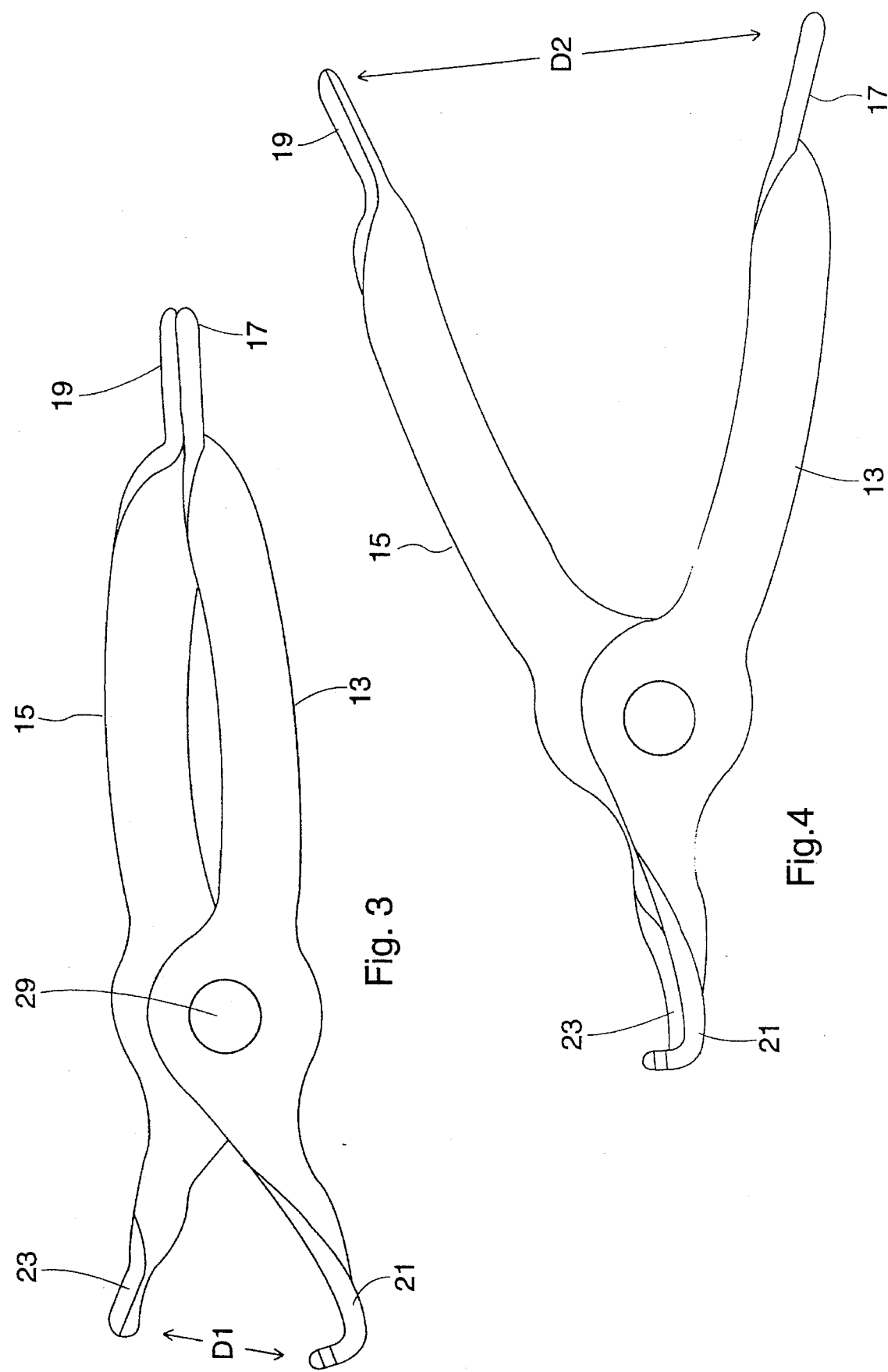

5,475,941

PORK RIND PLIERS

BACKGROUND OF THE INVENTION

1. Field of the Invention

The invention relates to a device for attaching and removing pork rinds to and from fishing hooks.

2. Description of the Prior Art

Pork rinds have long been used as fishing bait which are fastened to the hook portion of a fishing hook. Pork rinds, however, are difficult to attach to a fishing hook, and once attached, are difficult to remove from the hook. This is due to the nature of the material forming the pork rind. Devices used in the past to assist with the attachment and removal of pork rinds to and from fishing hooks have not proven satisfactory.

SUMMARY OF THE INVENTION

Therefore, it is an object of the present invention to provide a device which may be used to easily attach a pork rind to a fishhook, and which may also be used to easily remove a pork rind from a fishhook.

The device comprises pliers having a first arm with first and second ends and a second arm with first and second ends. Means is provided for pivotally coupling the two arms together. The first ends of the arms cooperatively form a pork rind attaching end and the second ends of the arms cooperatively form a pork rind removing end. The first ends are movable to open and closed positions and the second ends are movable to open and closed positions. The first ends comprise a slotted member located opposing and facing a bearing member respectively. The slotted member has a slot with an open end extending therethrough for receiving a hook end of a fishhook. The bearing member has a bearing surface for supporting a rounded portion of the fishhook such that a pork rind may be located between the two members and attached to the hook of a fishhook by moving the first ends to the closed position. The second ends comprise a hook retaining member located opposing a hook receiving member. The hook retaining member and the hook receiving member have two slots with open ends respectively that extend transverse to each other such that the rounded end of a fishhook may be located in the slot of the hook retaining member and the hook end of a fishhook may be located in the slot of the hook receiving member with an attached pork rind located on a side of the hook receiving member facing away from said hook retaining member for removing the pork rind from the hook when the second ends are moved to an open position.

BRIEF DESCRIPTION OF THE DRAWINGS

FIG. 3 is a side view of the pliers with the pork rind removing ends in fully open positions and the pork rind attaching ends in fully open positions.

FIG. 4 is a side view of the pliers with the pork rind removing ends in fully closed positions and the pork rind attaching ends in fully open positions.

DESCRIPTION OF THE PREFERRED EMBODIMENTS

Figure 1:
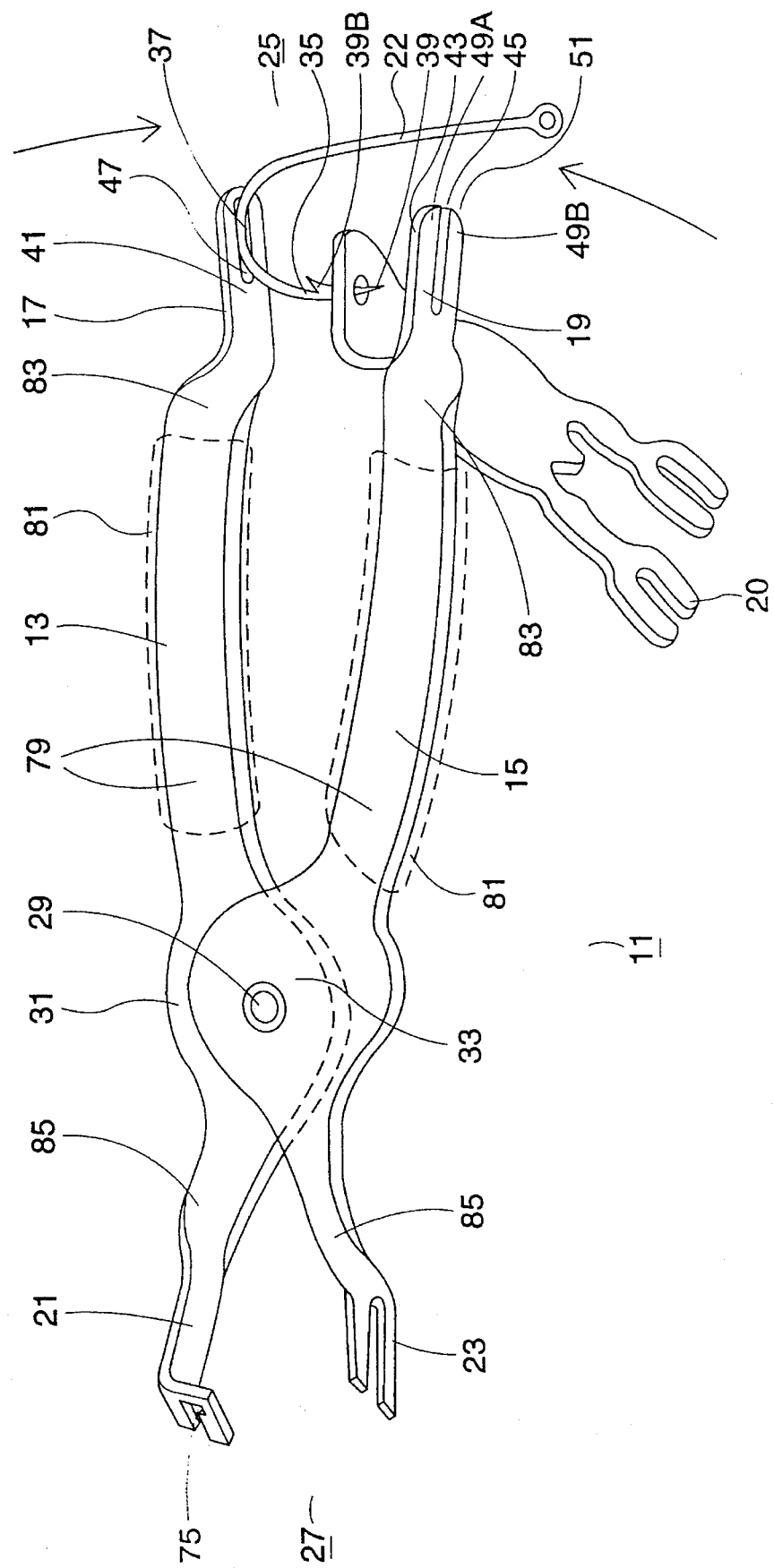
FIG. 1 is a perspective view of the pork rind pliers of the present invention in a position to attach a pork rind onto a fishhook.

Referring now to FIG. 1, the pork rind pliers 11 of the invention is identified by reference numeral 11. The pliers 11 have first and second elongated metal arms 13 and 15. Arm 13 has first and second opposite ends 17 and 21 and arm 15 has first and second opposite ends 19 and 23. The arms 13 and 15 are pivotally coupled together by a rivet 29 which extends through apertures formed through intermediate positions 31 and 33 of the arms 13 and 15. The first ends 17 and 19 of the arms 13 and 15, respectively, cooperatively form a pork rind attachment end 25 of the pliers 11 which may be used to attach a pork rind 20 onto a fishhook 22. The second ends 21 and 23 of the arms 13 and 15, respectively, cooperatively form a pork rind removing end 27 of the pliers 11 which may be used to remove a pork rind 20 from a fishhook 22 (See FIG. 2).

The arms 13 and 15 can pivot about the rivet 29 which extends through and secures the overlapping portions 31 and 33 together. The arms 13 and 15 may be pivoted to locate the ends 17 and 19 in open and closed positions relative to each other as shown in FIGS. 4 and 3 and to locate the ends 21 and 23 in open and closed positions relative to each other as shown in FIGS. 3 and 4. The ends 17 and 19 are located opposing each other, and the ends 21 and 23 are located opposing each other. In an open position, the opposing ends 17 and 19, and opposing ends 21 and 23, are spaced apart so that a hook portion 35 of a fishhook 22 may be located between the ends 17 and 19 or 21 and 23. The fishhook shown has a portion 35 which extends from a rounded end portion 37 to a hook end 39. In a closed position, the opposing ends 21 and 23, are located adjacent to each other. The arms 13 and 15 may pivot about the rivet 29 so that the ends 17 and 19 may move from an open position to a closed position as the ends 21 and 23 move from a closed position to an open position and vice versa.

As shown in FIG. 1, the pork rind attachment end 25 of the pliers 11 is structured to facilitate attachment of a pork rind 20 onto the hook portion 35 of the fishhook 22. The hook portion 35 of the fishhook 22 may be located between flat inner faces 41 and 43 of the ends 17 and 19, respectively, when the ends are located in an open position. A pork rind 20 may be located at the hook end 39 of the hook portion 35 located between the open ends 17 and 19. The pork rind 20 is forced onto the hook end 39 of the hook portion 35 when the ends 17 and 19 are moved from the open position to a closed position. When the ends 17 and 19 are located in a closed position the hook end 39 of the hook portion 35 extends through an insertion slot 45 in the end 19 of the arm 15 and the pork rind 20 is located on the fishhook 22 between the inner faces 41 and 43 of the ends 17 and 19.

The inner face 41 of the end 17 of the arm 13 faces the inner face 43 of the end 19 of the arm 15. The inner face 41 receives and supports the rounded end 37 of the fishhook 22 while the pork rind 20 is being attached onto the hook end 39. In a preferred embodiment, a groove 47 is formed in the face 41 and extends lengthwise along the center of the inner face 41 for receiving and stabilizing the rounded end 37 of the fishhook 22. The groove 47 does not extend through the end 17. The groove 47 has a width larger than the diameter of the rounded end 37 of the fishhook 22 so the rounded end will fit within the groove.

Prongs 49A and 49B extend lengthwise from the edge 51 of the end 19 of the arm 15 for a substantial portion of the end 19. The insertion slot 45 is formed between the prongs 49A and 49B and extends lengthwise centrally through the end 19 of the arm 15 from the edge 51 of the first end 19. The insertion slot 45 has a width between the prongs 49A and 49B that is larger than the diameter of the hook end 39 of a fishhook 22 but smaller than a pork rind 20 so that the hook end 39 of a fishhook 22 will fit through the insertion slot 45 while the pork rind 20 is retained against the insides of the prongs 49A and 49B between the inner faces 41 and 43 of the ends 17 and 19. In a preferred embodiment, the insertion slots 45 is located extending through the end 19 of the arm 15 opposite the groove 47 in the end 17 of the arm 13 so that the fishhook 22 may be stabilized in the groove 47 while the hook end 39 is forced through the pork rind into the insertion slot 45 when the pork rind 20 is forced onto the fishhook 22.

Figure 2:
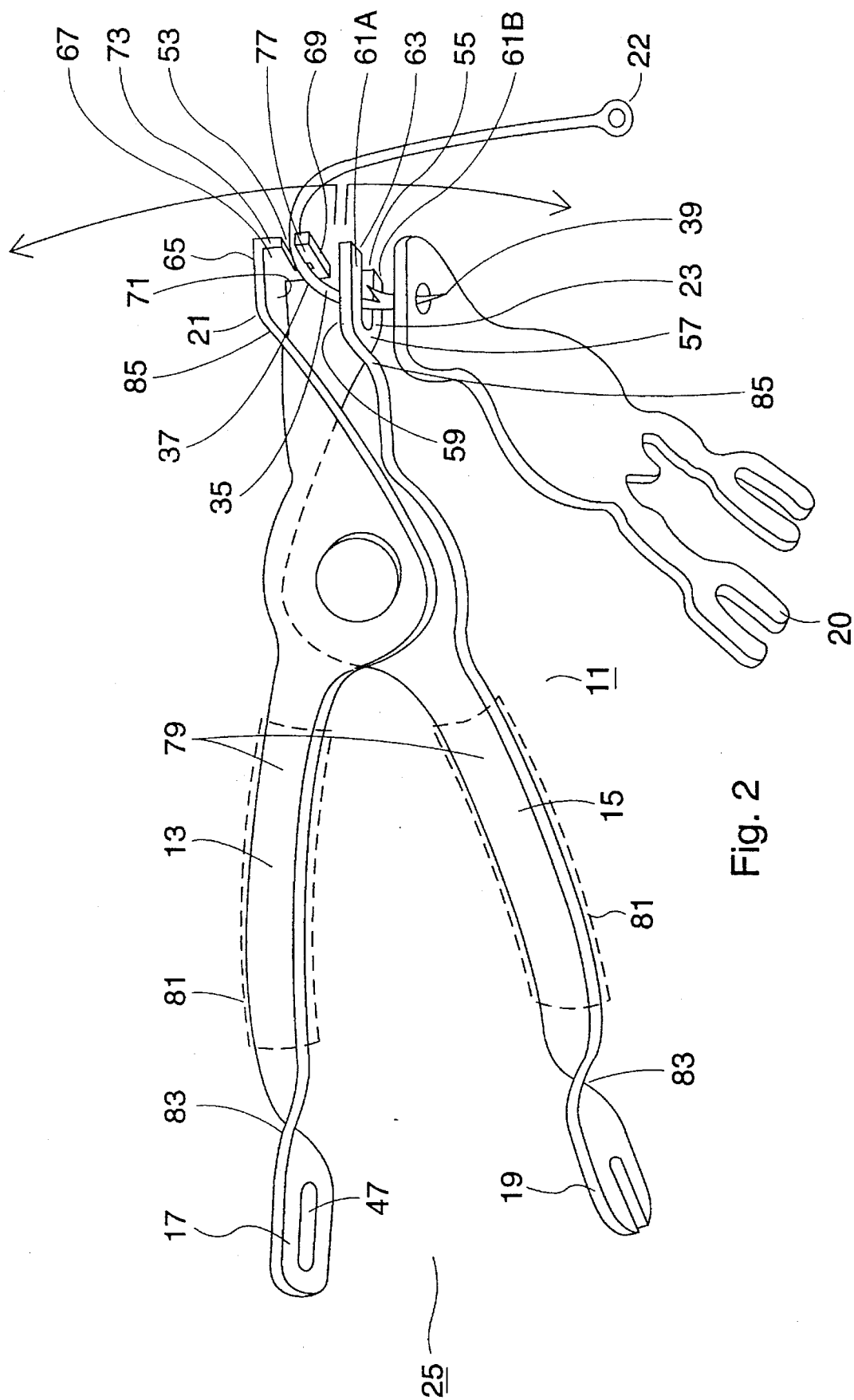
FIG. 2 is a perspective view of the pork rind pliers in a position to remove a pork rind from a fishhook.

As shown in FIG. 2, the pork rind removing end 27 of the pliers 11 is structured to facilitate removal of a pork rind 20 from the hook portion 35 of a fishhook 22. The end 21 of the arm 13 had a hook retaining slot 53 which receives and retains the rounded end portion 37 of a fishhook 22. The end 23 of the arm 15 has a slot 55 through which the hook end 39 of the fishhook 22 is located when the pork rind removing end 27 is located in a closed position. The pork rind 20 is located on the hook end 39 of the fishhook 22 adjacent the outer face 57 of the end 23 of the arm 15. The hook end 39 passes through the slot 53 when the pork rind removing end is moved from its closed position to its open position causing the outer face 57 to force the pork rind 20 off of the fishhook 22.

Removal prongs 61A and 61B extend lengthwise from the outer edge 63 of the end 23 of the arm 15 for a substantial portion of the end 23. The slot 55 is formed between the removal prongs 61A and 61B extending lengthwise centrally through the end 23 of the arm 15 from the outer edge 63 of the end 23. The slot 55 has a width between the removal prongs 61A and 61B that is larger than the diameter or size of the hook end 39 of a fishhook 22 but smaller than a pork rind 20 so that the hook end 39 of the fishhook 22 will fit through the slot 55 while the pork rind 20 is retained against the outer face 57 of the end 23 when the ends 21 and 23 of the arms 13 and 15 are moved from their closed positions to their open positions.

The end 21 of the arm 15 has an inner portion 65 and an outer potion 67 the latter of which extends transverse to the inner portion 65 and has an outer edge 69. When the end 21 and 23 are located in a closed position the inner face 71 of the inner portion 65 of end 21 is located adjacent the inner face 59 of end 23, and the outer portion 67 extends over the outer edge 63 of end 23 transverse to the end 23 with the end edge 69 located past the outer face 57 of end 23.

The hook retaining slot 53 extends through the outer portion 67 of end 21. The hook retaining slot 53 extends from a slot edge 73 to a generally central location 75 in the outer portion 67, where the slot edge 73 extends transversely between the inner portion 65 of end 21 and the end edge 69, and the hook retaining slots 53 extends parallel to the end edge 69. In a preferred embodiment, the hook retaining slot 53 is wider at the central location 75 so that a fishhook 22 positioned at the central location 75 of the hook retaining slot 53 will not slip out of the slot 53 (See FIG. 1).

The hook retaining slot 53 extends transverse to the slot 55 in the end 23 so that the rounded end portion 37 of a fishhook 22 may be located in the hook retaining slot 53 and the hook end 39 with an attached pork rind 20 may be located extending through the slot 55 when the ends 21 and 23 are located in a closed position. A hook retaining prong 77 is formed between the hook retaining slot 53 and the end edge 69 positioned to restrain movement of the rounded end portion 37 of a fishhook 22 located in the hook retaining slot 53 when a pork rind 20 is removed from the hook end 39 of the fishhook by moving the ends 21 and 23 from the closed position to an open position. In the closed position of the ends 21 and 23, the hook retaining slot 53 and the hook retaining prong 77 extend past the outer face 57 of end 23. In the open position of the ends 21 and 23 the hook retaining slot 53 and the prong 77 are spaced apart from the inner face 59 of arm 23.

Referring now to FIGS. 1 and 2, in a preferred embodiment the body 79 of each arm 13 and 15 is encased by handle grip sleeves 81 adjacent the portions 31 and 33 of the respective arms. Each handle grip 81 is formed of a pliable plastic material which enhances the ease with which the pliers 11 may be gripped.

In a further aspect of a preferred embodiment of the invention, each of the arms 13 and 15 are formed of flat metal members. Each of the arms 13 and 15 has a first twisted portion 83 such that the ends 17 and 19 of the arms 13 and 15, respectively, extends transverse to the body 79 of arms respectively. Each arm 13 and 15 also has a second twisted portion 85 such that the end 21 and 23 of the arms 13 and 15, respectively, extends transverse to the body 79 of the arms respectively.

In operation, the pork rind pliers are easily used to attach a pork rind 20 onto a fishhook 22 or to remove a pork rind 20 from a fishhook 22. To attach a pork rind 20 onto a fishhook 22, the fishhook 22 and pork rind 20 are located at the pork rind insertion end 25 of the pliers 11. The ends 17 and 19 of the arms 13 and 15, respectively, are located in an open position. The rounded end portion 37 of the fishhook 22 is located in the groove 47 in the inner face 41 of the end 17 with the hook end 39 of the fishhook oriented facing the slot 45 in the end 19 of the arm 15. The pork rind 20 is placed at the hook end 39 of the fishhook 22 and the ends 17 and 19 of the pliers 11 are brought together so the ends hold the fishhook and the pork rind between their inner faces 41 and 43. The arms 13 and 15 of the pliers 11 are pivoted about the rivet 29 to move the ends 17 and 19 towards their closed position, forcing the hook end 39 of the fishhook 22 through the pork rind 20 and through the insertion slot 45. The inner face 43 of the end 19 of the arm 15 engages and holds the pork rind 20 as the hook end 39 of the fishhook pierces and pushes through the pork rind such that the rind 20 is located on the hook portion 35 past the barb 39AB the pork rind. Once the ends 17 and 19 reach their closed position the pork rind 20 is located on the fishhook 22. The fishhook 22 and pork rind 20 are removed from the pork rind insertion end 25 of the pliers 11 by pivoting the arms 13 and 15 to locate the ends 17 and 19 in their open position and withdrawing the fishhook with the attached pork rind form the pliers.

To remove a pork rind 20 from a fishhook 22, the fishhook 22 and pork rind 20 are located at the pork rind removing end 27 of the pliers 11. The ends 21 and 23 of the arms 13 and 15, respectively, are located in a closed position. The rounded end portion 37 of the fishhook 22 is located in the hook retaining slot 53 and the hook end 39 is located extending through the slot 55. The pork rind 20 attached to the hook end 39 of the fishhook 22 is located adjacent the outer face 57 of the end 23 of the arm 15. The arms 13 and 15 are pivoted to move the ends 21 and 23 apart. As the ends 21 and 23 move apart, the hook end 39 passes through the slot 55 while the rind 20 is pushed off of the hook end 39 by the outer face 57 of the end 23. Once the ends 21 and 23 reach their open position, the hook end 39 has been moved completely through the slot 55 and the pork rind has been removed from the hook end 39 of the fishhook.

In one embodiment, the arms 13 and 15 may be formed of a suitable iron. They each have lengths of about 7¼ inches with arm 13 being slightly longer than arm 13. D1 is about 1⁵⁄₁₆ inches and D2 is about 3¼ inches. It is to be understood that the arms 13 and 15 may have other dimensions and open to different widths.

The foregoing disclosure and showings made in the drawings are merely illustrative of the principles of this invention and are not to be interpreted in a limiting sense. For example, the arms 13 and 15 need not be coupled together by rivet 29 but may be coupled together by any means which enables the arms to pivot with respect to each other while securing the arms together.

It is to be understood that the pliers of the invention may be used to attach and remove other types of bait to and from a fishhook.

I claim:

1. Pork rind pliers for attaching and removing a pork rind to and from a fishhook, comprising:

a first arm having first and second ends;

a second arm having first and second ends, pivot means for pivotally coupling said first and second arms together with said first ends of said first and second arms, located on one side of said pivot means and said second ends of said first and second arms located on an opposite side of said pivot means;

said first ends of said first and second arms cooperatively forming a pork rind attaching end;

said second ends of said first and second arms cooperatively forming a pork rind removing end;

said first ends being movable to open and closed positions and said second ends being movable to open and closed positions;

said first ends comprise a slotted member located opposing and facing a bearing member respectively, said slotted member having a slot with an open end extending therethrough for receiving a hook end of a fishhook, said bearing member having a bearing surface for supporting a rounded portion of the fishhook such that a pork rind may be located between said two members and attached to the hook of a fishhook by moving said first ends to said closed position;

said second ends comprise a hook retaining member located opposing a hook receiving member, said hook retaining member and said hook receiving member have two slots with open ends respectively that extend transverse to each other such that the rounded end of a fishhook may be located in said slot of said hook retaining member and the hook end of a fishhook may be located in said slot of said hook receiving member with a pork rind located on a side of said hook receiving member facing away from said hook retaining member.

2. The pork rind pliers of claim 1, wherein:

said first and second arms being movable to first positions where said first ends are located next to each other in a closed position and said second ends are located away from each other in an open position, said first and second arms being movable to second positions where said first ends are located away from each other in an open position and said second ends are located next to each other in a closed position.

3. The pork rind pliers of claim 2, wherein:

said hook retaining member and said slot of said hook retaining member of said pork rind removing end of said pliers extend past said hook receiving member of said pork rind removing end of said pliers when said second ends of said pliers are located in a closed position.

4. The pork rind pliers of claim 3, comprising;

a groove formed in said bearing member on a side facing said slotted member for receiving the curved portion of a fishhook.

5. The pork rind pliers of claim 2, comprising:

a groove formed in said bearing member on a side facing said slotted member for receiving the curved portion of a fishhook.

* * * * *